Sept. 6, 1949.     R. G. LE TOURNEAU     2,481,129
SCREW AND NUT ACTUATOR
Filed Nov. 16, 1944
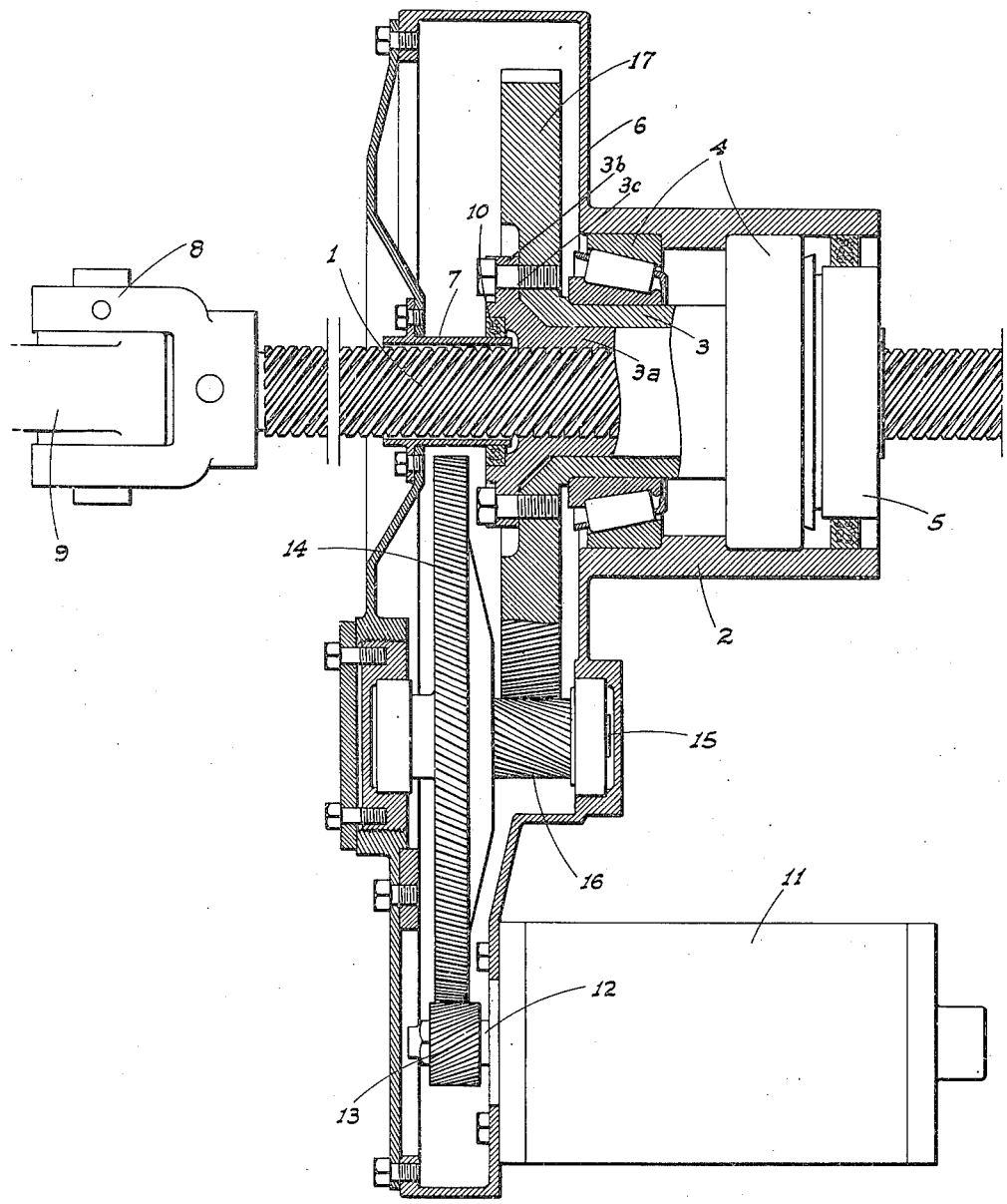
INVENTOR
R. G. LeTourneau
BY
ATTORNEYS Patented Sept. 6, 1949

2,481,129

UNITED STATES PATENT OFFICE 2,481,129

SCREW AND NUT ACTUATOR

Robert G. Le Tourneau, Peoria, Ill., assignor to R. G. Le Tourneau, Inc., Stockton, Calif., a corporation of California Application November 16, 1944, Serial No. 563,751

4 Claims. (Cl. 74—424.8)

This invention relates to, and it is an object to provide, an improved power driven, screw type actuator adapted to accomplish controlled motion of relatively movable parts between which the actuator is connected.

Another object of this invention is to provide an actuator of the type described in which the power loss due to the friction of the screw is relatively low; this result being obtained by the use of a multiple thread long-lead screw assembly so designed that the circumferential travel of the threads upon rotation of the rotation of the screw, is only approximately twice the corresponding axial movement of said screw. Thus a material advantage is gained over short-lead screws wherein the relatively great movement of the engaged surfaces of the screw assembly produces a friction loss out of proportion, practically, to the axial movement of the screw.

A further object of this invention is to provide a novel drive assembly for the actuator screw, said assembly being connected in compact relationship between said screw and the power source, which is here an electric motor.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

The figure of the drawing is a sectional elevation of the actuator.

Referring now more particularly to the characters of reference on the drawing, the actuator comprises a multiple thread long-lead screw 1 which projects axially through a cylindrical housing 2, extending within said housing through an elongated hub 3 which includes a tapped bushing 3a fixed therein and through which bushing the screw 1 is threaded. The bushing 3a is an initially separate part for ease of manufacture and is removably secured in connection with the hub 3 by means of a radial flange 3b thereon, and cap screws 3c. The hub 3 is rotatably but axially immovably journaled in longitudinally spaced bearings 4 secured in said housing. At the rear end of the housing the screw 1 projects through a sealing unit 5.

The forward end of the housing 2 is fixed in connection with and opens into a relatively shallow, transversely extending, gear case, indicated generally at 6, the screw projecting through an axial sleeve 7 in said case to a termination outwardly thereof. At its forward or outer end the screw 1 has a clevis 8 non-rotatably fixed thereon, said clevis being adapted for connection with the part 9 intended to be moved by the actuator, which part 9 is non-rotatable. The actuator is affixed to a non-movable part (not shown) by attaching the housing and case structure thereto. A suitable seal 10 is formed between the inner end portion of the sleeve 7 and the adjacent end of the hub bushing 3a. The hub 3 is driven by a reversible electric motor 11 by means of a gear train within the gear case 6, which gear train comprises the following:

The motor 11 is fixed to the gear case in spaced parallel relation to the screw 1, with the motor shaft 12 projecting into said case 6. A pinion 13 is fixed on motor shaft 12 and meshes in driving relation with a relatively large diameter intermediate gear 14 journaled in case 6, said gear including a shaft 15 on which a pinion 16 is secured. The pinion 16 meshes in turn with a drive gear 17 formed with the hub 3.

It will be seen that upon operation of the motor 11, the above described gear train will function to rotate the hub 3 and to advance or retract the screw 1, depending upon the direction of rotation, and to correspondingly advance or retract the movable part 9.

By virtue of the use in the above described actuator of a multiple thread, long-lead screw, I accomplish the relative speed of a cam type actuator, and also avoid the relatively high friction loss of those actuators which include a short-lead screw. With the mechanism of my actuator the differential between power input and power output is much less than with other available mechanisms; this because of the fact that the circumferential travel of the threads upon rotation of the screw, is only approximately twice the corresponding axial movement of said screw.

As shown, the gears and pinions are helically cut in such a manner that the thrust on the screw when under load is opposed by the thrust of the gearing. By so doing, considerable thrust load is relieved from the bearings, making for less friction and greater gear efficiency.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An actuator comprising a cylindrical housing, a pair of spaced apart bearings mounted in the housing, a gear case mounted at one end of the housing and in open communication with said housing, a gear disposed in the gear case, an elongated hub on the gear, such hub projecting into the housing and being supported in said bearings, a bushing separate from the hub but projecting into the latter, means detachably securing the bushing immovable relative to the hub, a screw threaded through the bushing, a motor fixed to the gear case, and means connecting the motor in driving relation with the gear.

2. An actuator as in claim 1 in which the gear and hub are integral.

3. An actuator as in claim 1, in which the last named means comprises a train of gears disposed in the case and connected in driving relation between the motor and the first named gear.

4. An actuator as in claim 2 including a protective sleeve surrounding the screw and extending from the front wall of the case to a point adjacent the hub, and sealing means between adjacent ends of the sleeve and hub.

ROBERT G. LE TOURNEAU.

REFERENCES CITED

The following references are of record in the file of this patent:

UNITED STATES PATENTS

| Number | Name | Date |
|---|---|---|
| 801,012 | Howard | Oct. 3, 1905 |
| 1,401,580 | Brush | Dec. 27, 1921 |
| 1,473,140 | Church | Nov. 6, 1923 |
| 1,847,693 | Kindervater | Mar. 1, 1932 |
| 2,311,972 | Simpson | Feb. 23, 1943 |
| 2,328,897 | Gill | Sept. 7, 1943 |
| 2,403,092 | Lear | July 2, 1946 |